United States Patent Office 3,044,904
Patented July 17, 1962

3,044,904
SEPARATION OF DEXTROSE AND LEVULOSE
Gonzalo R. Serbia, Aguirre, P.R., assignor to Central
Aguirre Sugar Company, Boston, Mass., a Massachusetts trust
No Drawing. Filed Feb. 15, 1960, Ser. No. 8,511
6 Claims. (Cl. 127—46)

This invention concerns a method for the separation of dextrose from levulose using cation exchange resins. The method of separation depends on the discovery that when an aqueous solution containing the two sugars, dextrose and levulose, is contacted with the calcium salt of a nuclearly sulfonated styrene cation exchange resin the levulose is preferentially absorbed by the resin, leaving a major portion of the dextrose dissolved in the liquid surrounding the cation exchange resin. The surrounding liquid is displaced, flushed or drained from the ion exchange resin, after which the levulose is displaced, washed or extracted from the resin with water. The invention pertains particularly to a method in which the ion exchange resin is the calcium salt of a nuclearly sulfonated crosslinked polymer of a monovinyl aromatic hydrocarbon, preferably crosslinked with a polyvinyl compound such as divinylbenzene. Typical resins of this type are Dowex 50, made by The Dow Chemical Co., Amberlite IR–120, made by Rohm & Haas Co.; Chempro C–20, made by Chemical Process Co.; Permutit Q, made by Permutit Co.

In the practice of the invention, a bed of the granular sulfonated cation exchange resin in the calcium form is flooded with water. Then an aqueous solution containing dextrose and levulose is fed slowly to the bed so as to displace an equal volume of water therefrom. This flow should be slow so as to avoid, as far as possible, comingling of the solution with the water which is being displaced from the bed. Upon contact with the solution, the resin absorbs preferentially the levulose, leaving most of the dextrose in the surrounding liquid. The solution of dextrose and levulose is followed by a flow of water, preferably free of ionized salts. This flow of water causes the interstitial liquid surrounding the resin particles, which has been impoverished with respect to levulose, to emerge from the bed from the interstitial volume of water has been displaced, and will contain dextrose as its major sugar constituent. Usually, but not always, this fraction of the effluent liquid will be followed by one or more fractions having a composition approximating that of the starting solution. In such instances, this intermediate fraction or fractions can be returned to the ion exchange resin bed in a subsequent cycle. Finally a fraction will be obtained which will contain levulose as its major sugar constituent. When all the absorbed material has been extracted and washed from the resin bed the effluent liquid will consist of water, substantially free of either sugar. The resin bed is then in condition for re-use in treating a further amount of dextrose-levulose starting solution. The process can be carried out batchwise or continuously, e.g., with a Higgins contactor.

The aqueous solutions of dextrose and levulose from which fractions of the two sugars can be separated contain up to 60 percent by weight of total sugars. Higher densities require higher pressure differentials in order to maintain an adequate flow rate through the resin bed. Incompletely inverted sucrose is operable in this process because the levulose is then also preferentially absorbed by the resin and the sucrose is removed with the dextrose, whence it can be inverted and recycled, if desired.

The process of separation is carried out at temperatures between normal ambient temperature and 80° C. The extent of separation becomes greater as the temperature of the solution under treatment is increased. The preferred temperature range is 50° to 70° C.

The flow rate of sugar solution and subsequently water through the resin bed depends on conditions such as temperature, concentration of the sugar solution, particle size of the resin granules and depth of the resin bed. Rates of liquid flow of 0.1 to 0.5 gal./min./ft.$^2$ of cross-sectional area have been found satisfactory.

The degree of cross-linking of the resin matrix is such as to permit adequate diffusion of the levulose into the resin particle. Copolymers made with 1 to 12 percent of divinylbenzene are suitable for use in the process of the invention.

The following examples describe certain ways in which the invention has been practiced, and are not intended to limit its scope.

EXAMPLE I

A tube of approximately 3.75 inches internal diameter was filled to a depth of 38 inches with granules of the calcium salt of a nuclear sulfonated copolymer of styrene, ethylvinylbenzene and divinylbenzene. The granules were of from 50 to 100 mesh size according to the Tyler screen scale. The tube was provided with an outer covering of 1″ thick magnesia-asbestos insulation. The tube was held in a vertical position and was filled with water so that the granules were immersed therein. A total of 2000 ml. or 28 percent of the resin bed volume of an aqueous solution containing 25.9 weight percent of dextrose and 25.9 weight percent of levulose was fed to the tube at the rate of 75 ml. per minute (0.26 gal./min./ft.$^2$), thereby displacing an equal volume of water from the tube. The dextrose-levulose solution was obtained by inversion of a solution of sucrose with invertase enzyme. This was fed to the tube at 60° C. Immediately following the sugar solution water was fed to the tube at the same flow rate and temperature. The effluent liquid which was displaced from the tube by the feed of the starting solution and subsequently water, was collected in fractions of 710 ml. or 1/10 bed volume. Each portion was analyzed to determine its content of dextrose and levulose from the total solids content and the degree of polarization. These saccharimetric determinations are customary in sugar house practice. The first 4260 ml. of the effluent was nearly pure water. Starting with the seventh fraction of 710 ml. of the effluent liquid the fractions contained dextrose and levulose (expressed as percent by weight) in the concentrations given in the following table.

*Table I*

| Fraction No. | Solutes in Effluent Liquor | | |
|---|---|---|---|
| | Total Solutes, percent by Weight | Dextrose, percent by Weight | Levulose, percent by Weight |
| 7 | 3.0 | 3.0 | 0 |
| 8 | 14.7 | 13.8 | 0.9 |
| 9 | 29.4 | 22.2 | 7.2 |
| 10 | 40.7 | 22.7 | 18.0 |
| 11 | 39.4 | 14.2 | 25.2 |
| 12 | 26.2 | 5.2 | 21.0 |
| 13 | 4.1 | 0.5 | 3.6 |
| 14 | 0.5 | 0 | 0.5 |

EXAMPLE II

In order to obtain a better degree of separation of the sugars a cycle similar to Example I was made, collecting the effluent in fractions of 1/10 bed volume or 710 ml. Fractions 1 to 6, inclusive, were water and were discarded. Fractions 7, 8, 9 and 10 were fed to the resin bed in succession at 75 ml. per minute and 60° C., followed immediately by 2000 ml. of new starting solution of 25.9 percent dextrose and 25.9 percent levulose at the same rate and temperature. This was followed by fractions 11, 12, 13 and 14 and subsequently water. The effluent liquid was again collected in fractions of 1/10 bed volume and analyzed to determine dextrose and levulose. The results are shown in Table II.

*Table II*

| Fraction No. | Solutes in Effluent Liquor | | |
|---|---|---|---|
| | Total Solutes, percent by Weight | Dextrose, percent by Weight | Levulose, percent by Weight |
| 7 | 9.7 | 9.7 | 0 |
| 8 | 18.4 | 17.8 | 0.6 |
| 9 | 25.7 | 21.9 | 3.8 |
| 10 | 35.6 | 25.2 | 10.4 |
| 11 | 44.6 | 26.0 | 18.6 |
| 12 | 48.2 | 23.1 | 25.1 |
| 13 | 44.8 | 15.6 | 29.2 |
| 14 | 35.8 | 7.0 | 28.8 |
| 15 | 20.7 | 1.7 | 19.0 |
| 16 | 5.8 | 0 | 5.8 |
| 17 | 1.8 | 0 | 1.8 |

Pure dextrose was obtained from fractions 7, 8, 9 and 10 after evaporation and crystallization. Pure levulose was obtained from fractions 14, 15, 16 and 17 after evaporation and crystallization.

I claim:

1. A method for separating from one another dextrose and levulose, which comprises feeding to a water immersed bed of the calcium salt of a nuclearly sulfonated styrene cation exchange resin containing a cross-linking agent, an aqueous solution of dextrose and levulose, thus displacing water from the resin, thereafter feeding water to the bed to displace a further amount of liquid from the bed, and collecting successive fractions of the displaced effluent liquid, whereby there is obtained a fraction of the effluent liquid which contains dextrose as its major sugar constituent and a subsequent fraction of the effluent liquid which contains levulose as its major sugar constituent.

2. A method wherein the steps described in claim 1 are repeated using a further amount of the starting solution of dextrose and levulose and the same bed of ion exchange resin.

3. A method as in claim 1, wherein the temperature of the resin bed and the solution and water fed to the bed is from 20° C. to 80° C.

4. The method of claim 1 in which the total sugar content of the starting solution is from 10 to 60 percent by weight.

5. The method of claim 1 in which the sugar solution and subsequently water is passed through the resin bed at a flow rate of from 0.1 gal./min./ft.$^2$ to 0.5 gal./min./ft.$^2$.

6. The method of claim 1 in which the styrene cation exchange resin is polymerized from mixtures containing from 1 to 12 percent of divinylbenzene as cross-linking agent.

References Cited in the file of this patent

UNITED STATES PATENTS 2,868,677    Kopke                Jan. 13, 1959
2,890,972    Wheaton            June 16, 1959

OTHER REFERENCES

Synthetic Ion Exchangers, by Osborn, 1955, pages 53–63.

Ion Exchangers in Organic and Biochemistry, by Calmon and Kressman, Interscience Publishers, Inc., New York, N.Y., 1957, pages 178–187.

Ion Exchange Resins, by Kunin, 2nd ed., John Wiley & Sons, Inc., New York, N.Y., 1958, pages 298–300.